March 12, 1968     F. J. LUKETA     3,372,507
SELF-UPRIGHTING TRAWL DOORS
Original Filed Aug. 31, 1964     8 Sheets-Sheet 2
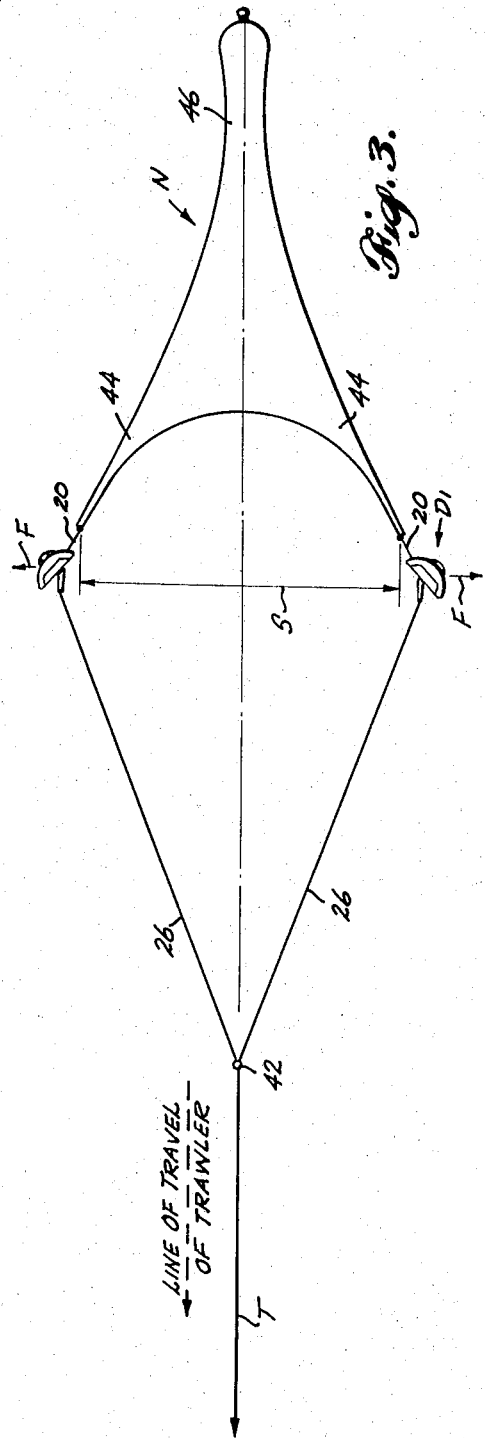
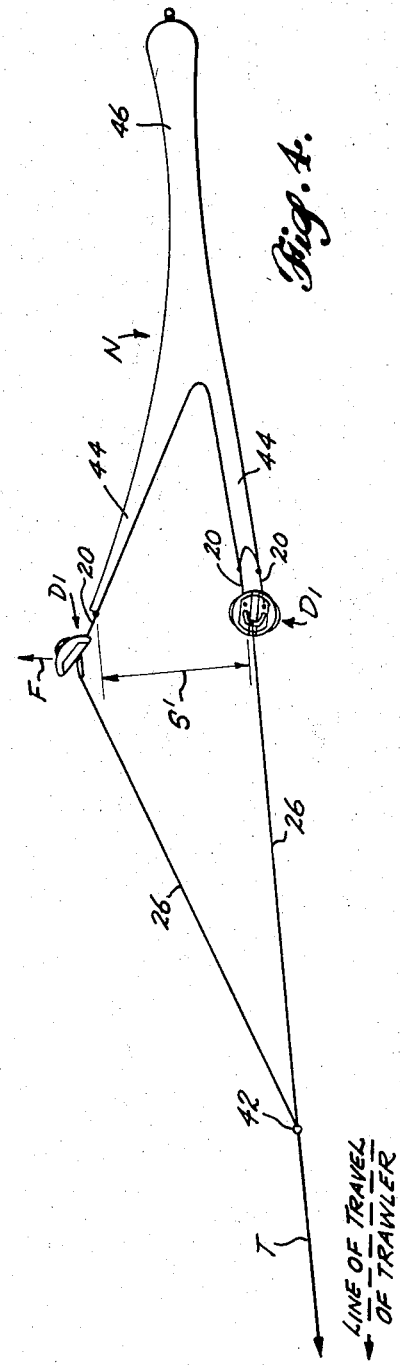
INVENTOR.
FRANK J. LUKETA
BY Mattis & Greybeal
ATTORNEYS

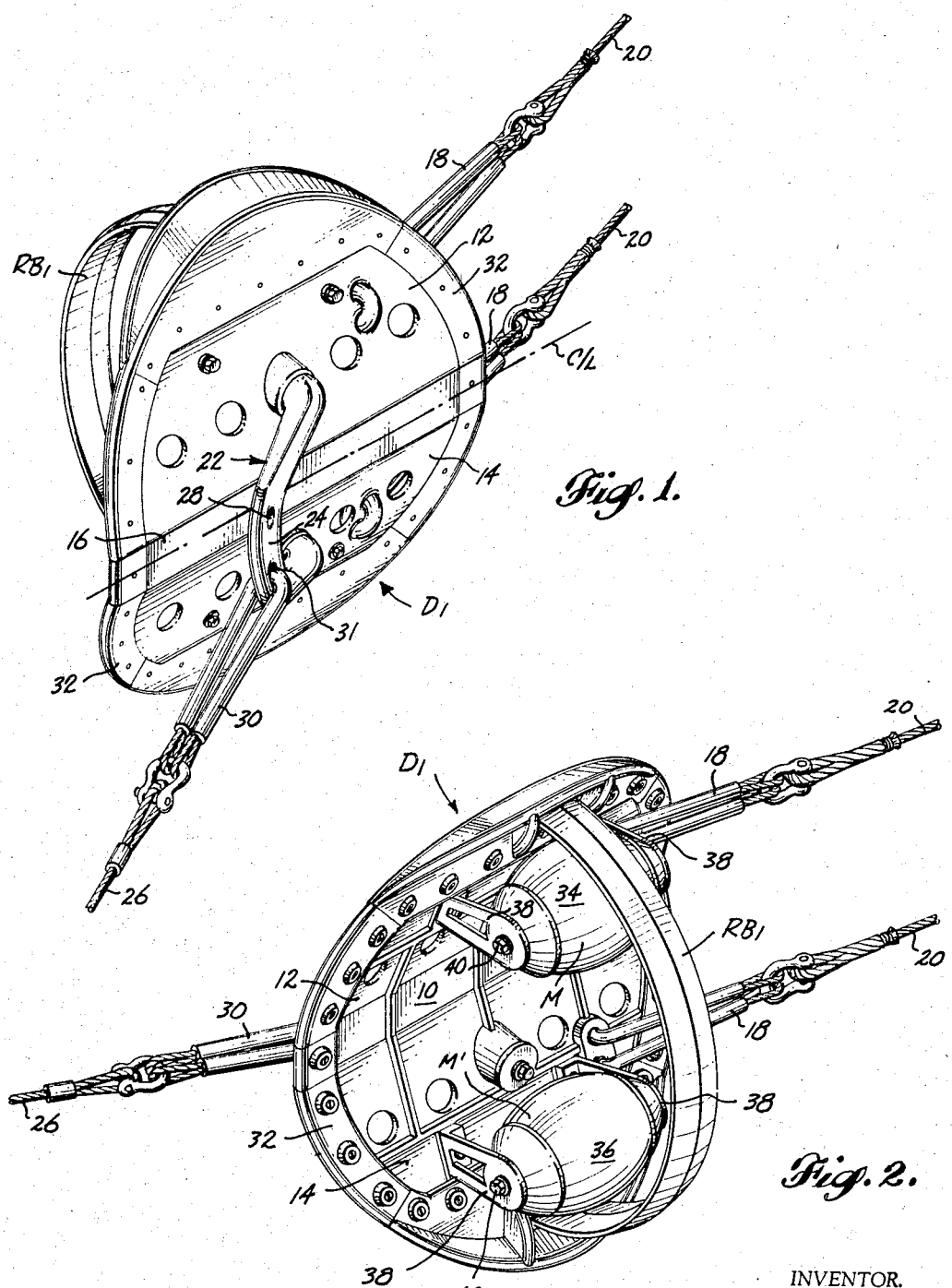

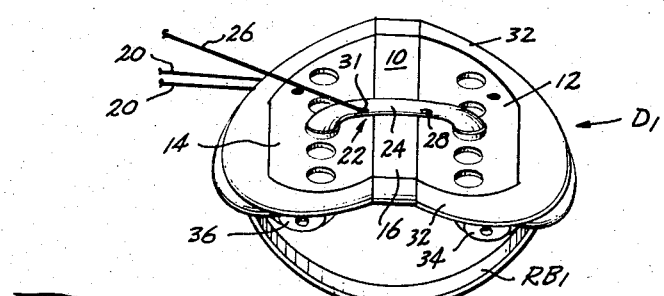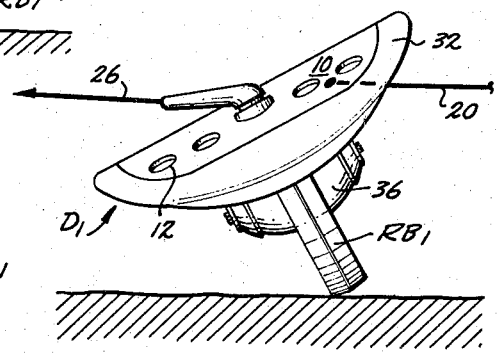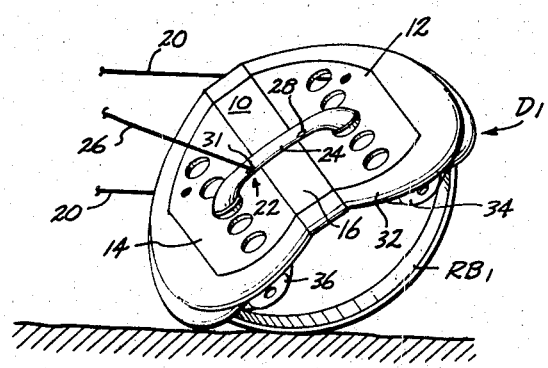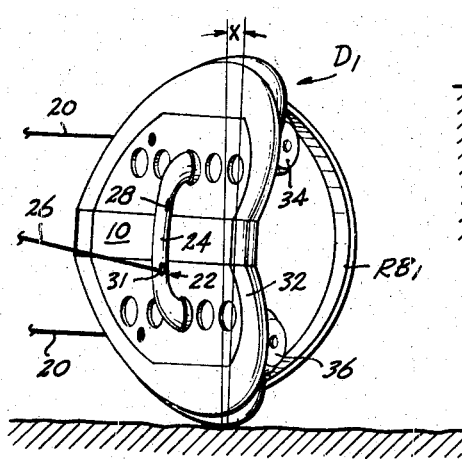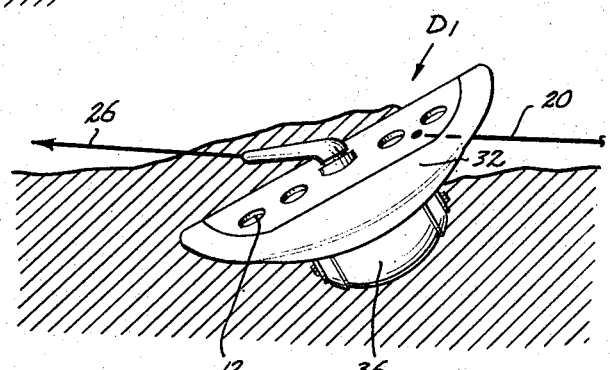

INVENTOR.
FRANK J. LUKETA
BY Mattix & Graybeal
ATTORNEYS

March 12, 1968  F. J. LUKETA  3,372,507
SELF-UPRIGHTING TRAWL DOORS
Original Filed Aug. 31, 1964  8 Sheets-Sheet 5

INVENTOR.
FRANK J. LUKETA
BY
ATTORNEYS

March 12, 1968  F. J. LUKETA  3,372,507
SELF-UPRIGHTING TRAWL DOORS
Original Filed Aug. 31, 1964  8 Sheets-Sheet 6
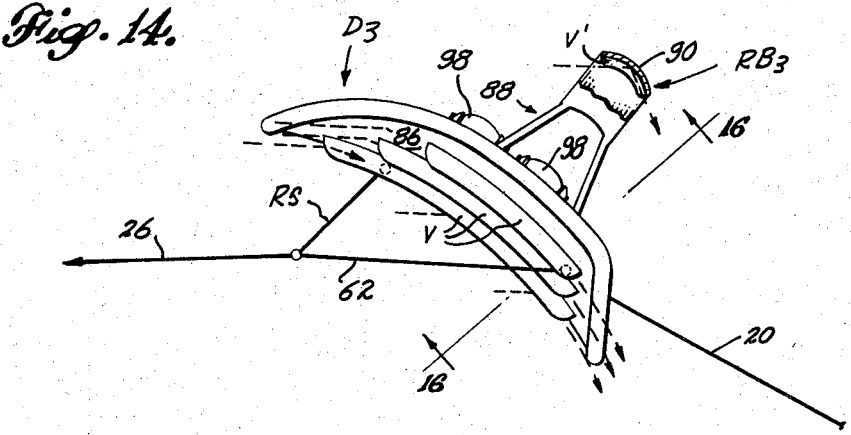
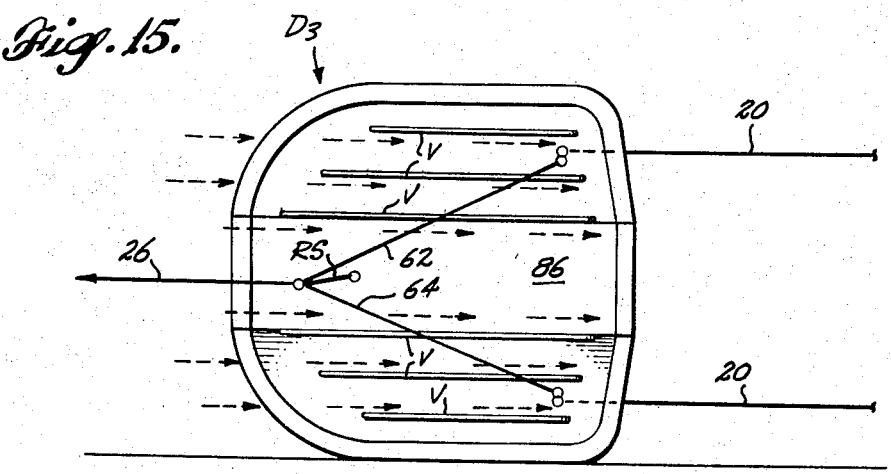
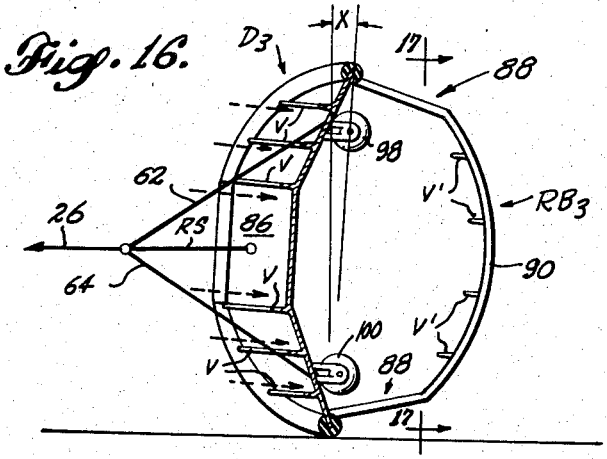 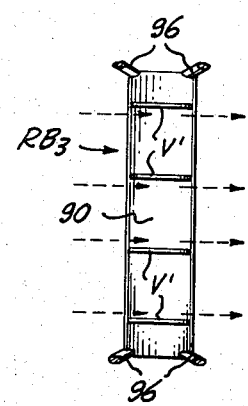
INVENTOR.
FRANK J. LUKETA
BY
Mattris & Graybeal
ATTORNEYS

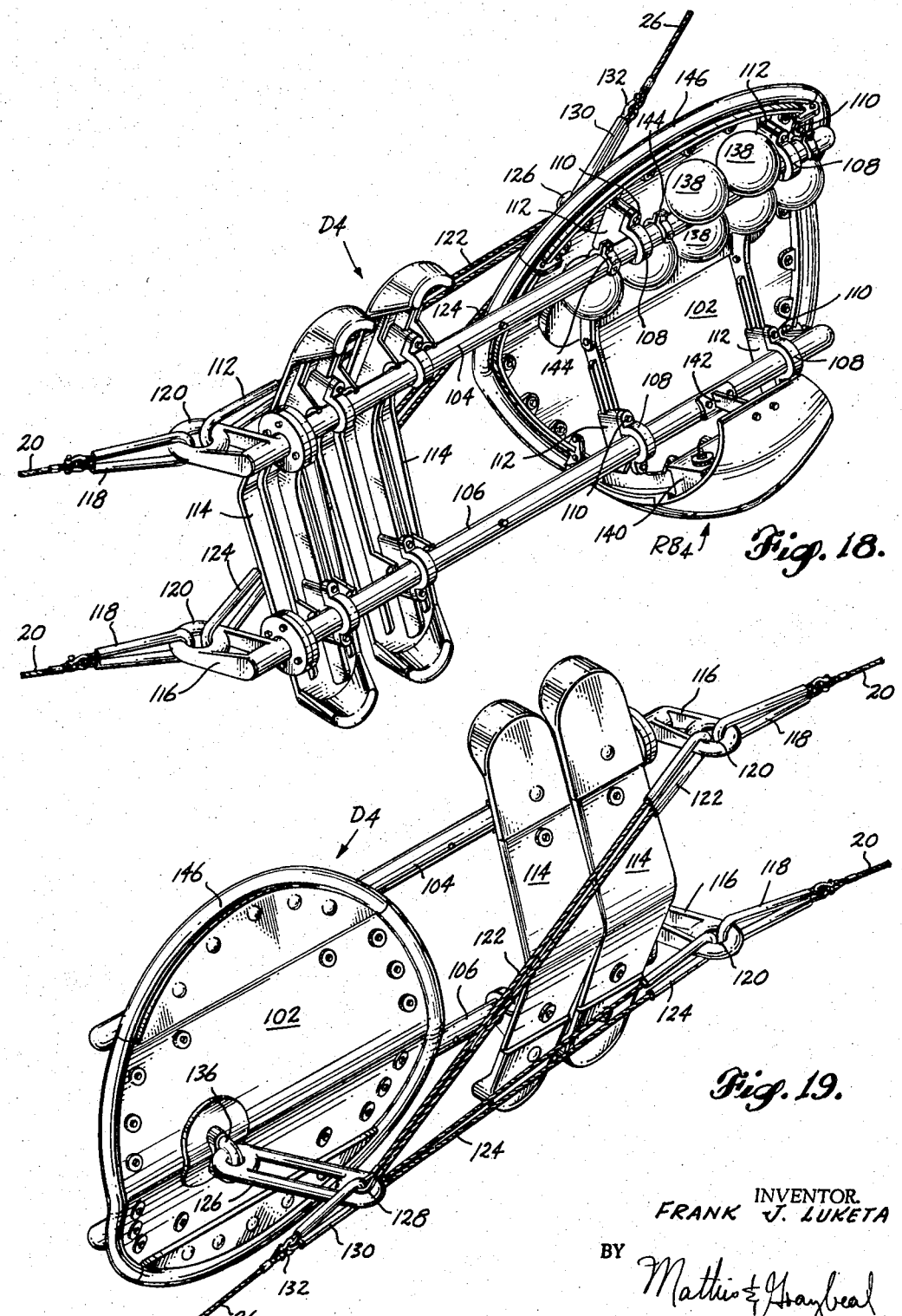

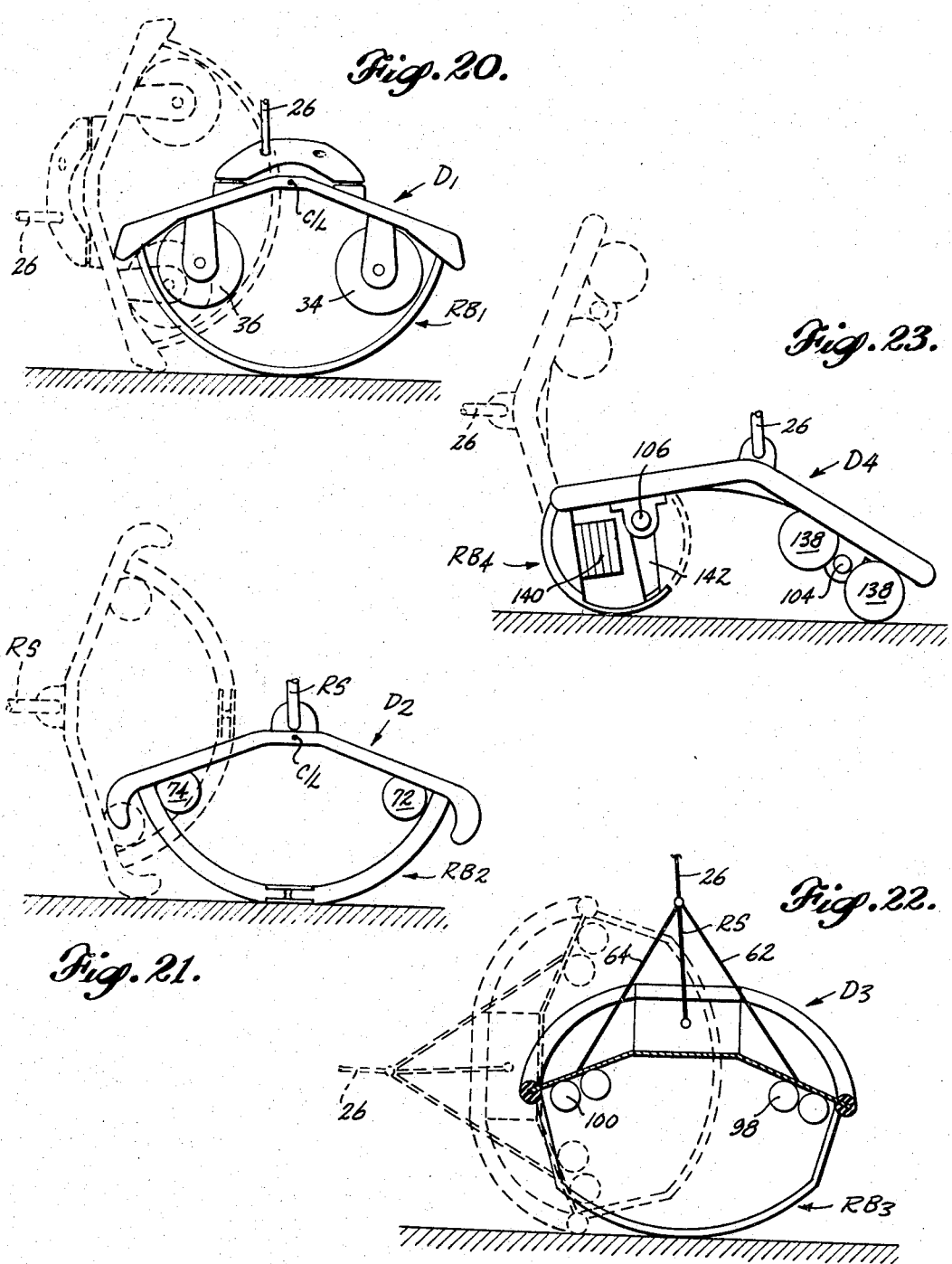

United States Patent Office 3,372,507
Patented Mar. 12, 1968

3,372,507
SELF-UPRIGHTING TRAWL DOORS
Frank J. Luketa, 5567 Greenwood Ave. N.,
Seattle, Wash. 98103
Continuation of application Ser. No. 393,139, Aug. 31,
1964. This application Jan. 30, 1967, Ser. No. 644,413
11 Claims. (Cl. 43—9)

ABSTRACT OF THE DISCLOSURE

A water reaction panel for trawl nets having ballast and buoyancy attachments and a roll bar mounted on the posterior side. The anterior side of the panel has a towing bridle and in some cases guiding vanes.

---

This application is a continuation of applicant's co-pending, now abandoned, application Ser. No. 393,139, filed Aug. 31, 1964, also entitled, Self-Uprighting Trawl Doors.

The present invention relates to trawl doors, and more particularly to roll bar attachments for trawl doors, especially adapted to prevent such doors from falling over rearwardly and lying flat on the bottom in a supine position wherein at least under some circumstances it is difficult, or practically impossible, to right it and cause it to assume a proper disposition or attitude.

Trawl doors are employed in pairs, one on each side of the trawl net. They function to spread apart the side elements of netting which precede and lead fish into the funnel of the net. Each door is towed in the water in a generally upright position, with its leading or anterior surface at an angle to the direction of tow. The water making relative contact with the leading faces of the doors is deflected thereby and accelerated into a new direction, creating reaction forces having laterally outwardly directed components which tend to move the doors apart and hold the mouth of the net open.

It is necessary at times during trawling to make turns with the trawler while the net is in the water. During a turn the outside door travels at a relatively great speed and traverses a long curvilinear path, whereas the inside door moves relatively slow and cuts a much sharper corner. During turning it quite often happens that slack develops in the towing lines leading to the inside door, and such door falls over flat on its posterior side and the entire net assembly merely pivots around such door. Often the inside door remains flat on its posterior side even after the trawler resumes a straight course, and it is difficult, and indeed in some instances practically impossible, to right it and cause it to resume an essentially upright disposition without first, at the wasteful expenditure of productive fish time, suspending the trawling operation and hauling the doors and net off the bottom to permit the malfunctioning door to regain its proper attitude. This is in part attributed to a suction effect. Water is pressing downwardly on the upwardly facing anterior surface of the door, and this pressure is not balanced because the opposite side of the door is in contact with the bottom. Also, when the door is lying flat the pull of the towing lines on the door occurs at a level that is very close to the bottom itself. Thus, the tendency is for the door to be merely dragged along the bottom when towed, rather than for it to be righted. The forwardly directed edge of the door is directed downwardly toward the bottom, and sometimes such edge actually digs into the bottom as the door is towed forwardly. When this happens the door may become "mudded in," i.e. anchor itself in the mud and prevent any further movement of the trawler or may cause lines to break. The doors and the associated gear (the net plus the payed out towing warp) must then all to frequently be cut loose at the trawler and abandoned with severe economic loss.

The present invention relates to an attitude control attachment, herein termed a "roll bar," which attachment is secured to the posterior side of the trawl door and serves to prevent it from falling over flat on the bottom and malfunction in the above described manner.

Generally speaking, roll bars according to the present invention comprise an arcuate member extending between the upper and lower edges of the door on its posterior side. One form of roll bar comprises a single, substantially C-shaped member attached at its respective ends to both the upper and the lower edge portions of the water reaction panel, as by bolts, for example. Another form comprises a plurality of arcuate tubular members arranged to fall on an imaginary, substantially spherical surface. A still another form includes an auxiliary water reaction surface which adds to the spreading effect of the door. Yet another form involves a plate member at the lower edge of the door that is essentially a segment of a sphere. In doors involving roll bars of this type, the ballast means for the door may be secured to the inboard side of the roll bar, rather than to the rear side of the water reaction panel, as is the usual case.

These and other objects, features, advantages and characteristics of the present invention will be apparent from the following description of certain typical and therefore non-limitive embodiments thereof, wherein like letters and numerals refer to like parts, and wherein:

FIG. 1 is a perspective view of the anterior side of a starboard door for a try net, such door involving one form of roll bar according to the present invention, which form comprises a single, substantially C-shaped member secured at its ends to the upper and lower edge portions of the water reaction panel, on the posterior side thereof;

FIG. 2 is a perspective view of the posterior side of the port side mate of the starboard door of FIG. 1, such view presenting a clear showing of the construction and arrangement of the roll bar;

FIG. 3 is a top plan view of a try net assembly, as the same is being towed forwardly in the water, with the two doors serving to hold open the mouth of the net;

FIG. 4 is also a top plan view of the try net assembly, but after the same has made a counterclockwise turn, during which the inside (port) door fell over on its posterior side and refused to be righted at the conclusion of the turn;

FIG. 5 is a side elevational view of the port door of FIG. 4, diagrammatically illustrating the condition that is herein termed "mudding in";

FIG. 6 is a rear end elevational view of the same type of door shown by FIG. 5, but equipped with a roll bar;

FIG. 7 is another rear elevational view, but taken at a later period of time from FIG. 6, after the roll bar has exerted its effect and after some pull has been exerted on the door by the towing warp;

FIG. 8 is a view similar to FIG. 7, but taken at still a later time, after the door has assumed a proper, substantially upright attitude, upon additional pull thereon by the towing warp;

FIG. 9 is a view to be compared with FIG. 5, such view showing the beneficial effect of the roll bar in keeping the door off the bottom;

Figure 10:
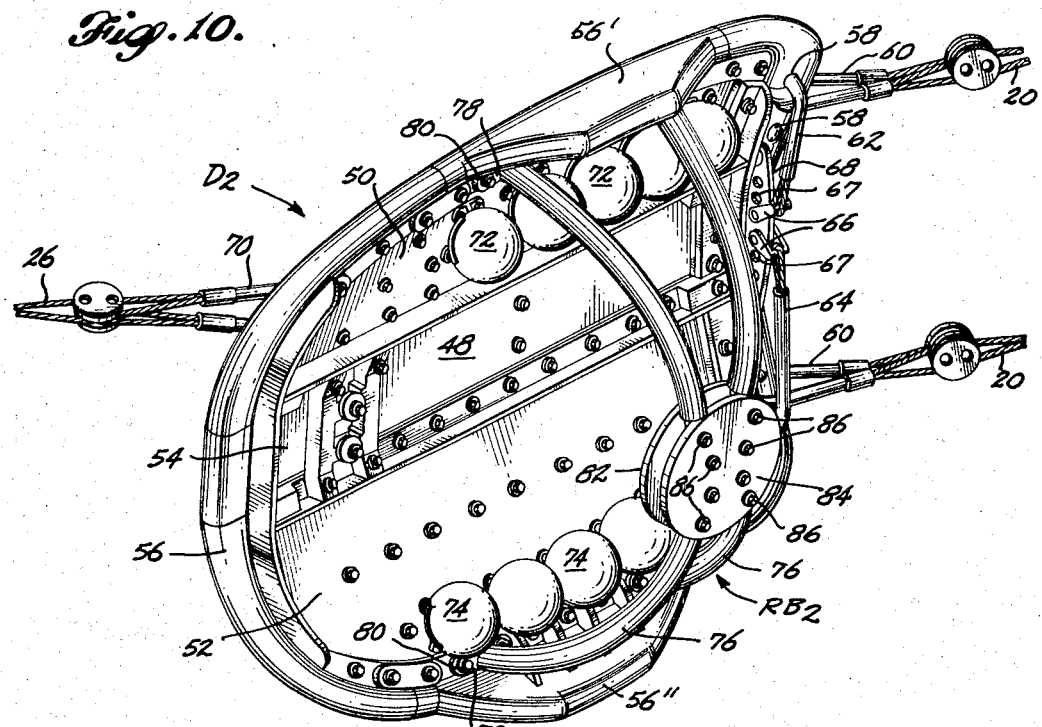
FIG. 10 is a perspective view of a modified form of trawl door involving a modified form of roll bar constructed according to the present invention, such view being taken toward the posterior side of the door, which is a port door.
Figure 11:
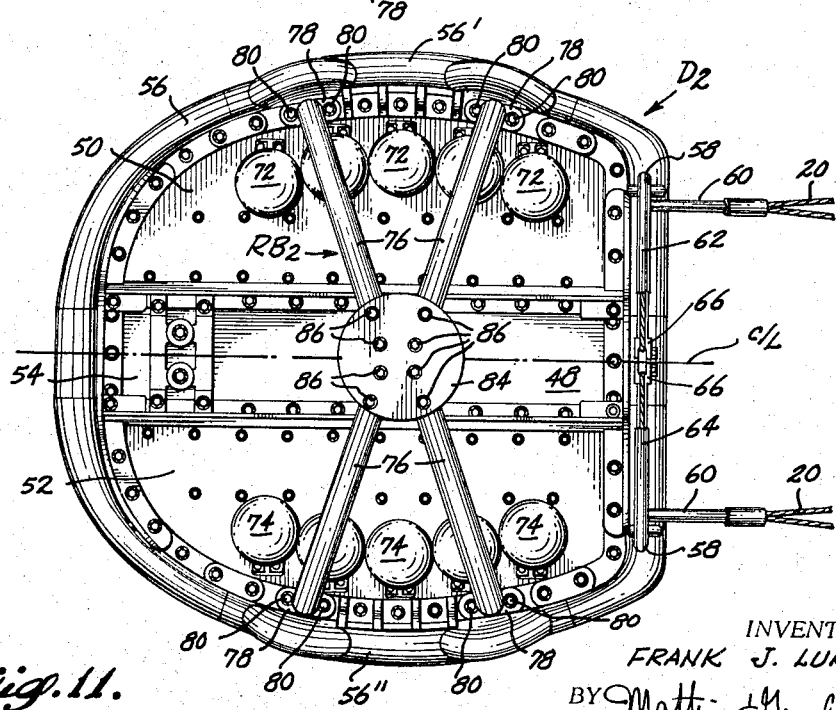
FIG. 11 is a side elevational view of the door of FIG. 10, looking toward the posterior side of such door.
Figure 12:
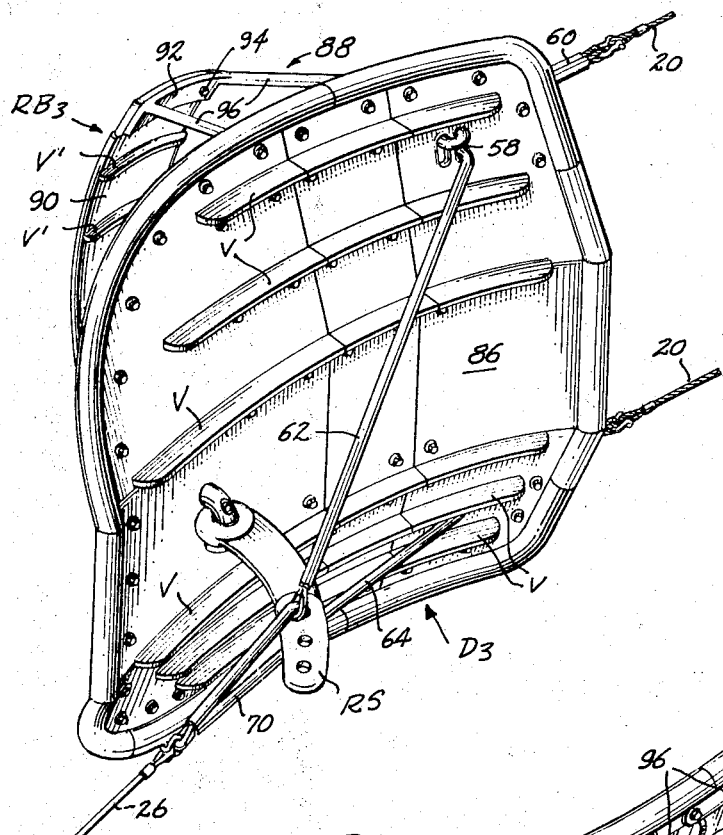
FIG. 12 is a perspective view of still another form of trawl door, involving still another form of roll bar ac-
Figure 13:
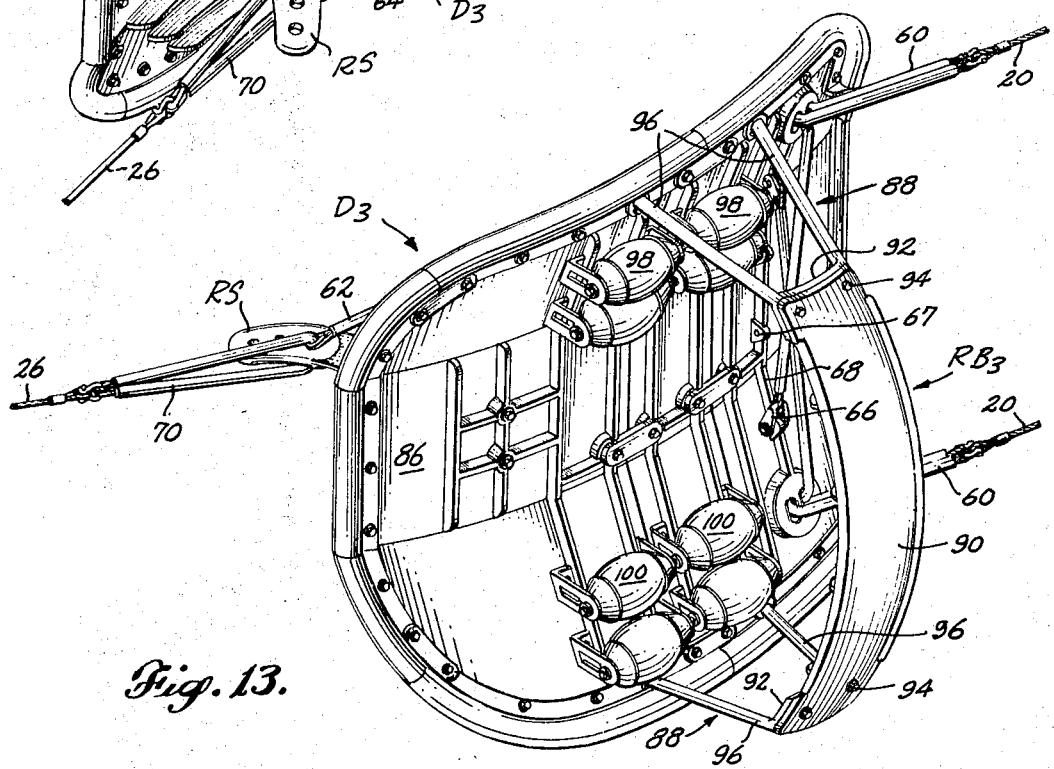

3 cording to the present invention, such roll bar comprising an auxiliary water reaction panel;

FIG. 13 is a perspective view of the port side mate of the door of FIG. 12, such view looking toward the posterior side of the door, and presenting a clear showing of the particular roll bar form involved;

FIG. 14 is a top plan view of the door of FIG. 12;

FIG. 15 is a side elevational view of the door of FIGS. 12 and 14, looking toward the anterior side of the water reaction panel;

FIG. 16 is a sectional view taken through the water reaction panel of the door form of FIGS. 12, 14 and 15, taken substantially along lines 16—16 of FIG. 14, such view presenting the roll bar in rear elevation;

FIG. 17 is a sectional view taken substantially along line 17—17 of FIG. 16, such view being a front elevational view of the auxiliary water reaction panel portion of the roll bar;

FIG. 18 is a perspective view of still another form of trawl door involving still another form of roll bar according to the present invention, such door being the starboard door, and such view being taken toward the posterior side thereof, and showing the ballast weight means disposed on the inboard side of the roll bar;

FIG. 19 is a perspective view of the port side mate of the door of FIG. 18;

FIG. 20 is a rear elevational view of the door form of FIGS. 1–9, showing by solid lines the door lying back on the roll bar, and by broken lines the door in its generally upright position of use;

FIG. 21 is a view like FIG. 20, but of the door form of FIGS. 10 and 11;

FIG. 22 is a view like FIGS. 20 and 21, but of the door form of FIGS. 12–17; and FIG. 23 is a view like FIGS. 20–22 but of the door form shown by FIGS. 18 and 19.

The trawl door D1 illustrated by FIGS. 1–9 and 20 is a try net door of the type forming the subject matter of my copending application Ser. No. 516,829, filed Nov. 26, 1965, and entitled Trawl Doors for Try Nets. Door D1 comprises a substantially circular, preferably cast aluminum, water reaction panel 10, which in vertical section is of a trihedral configuration, with symmetrical panel portions 12, 14 situated respectively above and below a horizontal center line CL, coinciding with the longitudinal axis of a central panel portion 16. The upper and lower panel portions 12, 14 are swept back substantially at the panel's leading or anterior face, the said portions 12, 14 having an angle therebetween of about 140° on the trailing or posterior side of the panel 10.

Upper and lower pairs of openings are provided in the rear portion of the panel 10, and flexible shackles 18, engaged in said openings (FIG. 1, for example), serve to connect the door D1 to net lines 20. A towing warp securement means or bridle 22 is situated on the anterior side of panel 10. Bridle 22 is constructed and arranged in a manner designed to minimize the drag which it produces. Preferably, it is of one piece construction and is made to have a generally U-shape. The bight portion 24 is arranged to make an angle with the anterior face of the panel 10 that is substantially equal to the angle of attack of said panel 10. This results in the general plane of the bridle 22 being in substantial parallelism with the path of travel of the trawler.

In the manner characteristic of the bridle arrangement disclosed and claimed in my U.S. Patent No. 3,048,936, issued Aug. 14, 1962, and entitled V-Door for Trawling and Bridle Therefor, and in my U.S. Patent No. 3,231,998, issued Feb. 1, 1966, for example, the towing line 26 is attached to the bridle 22 at a point downwardly offset from the center plane of the panel 10. This is so that in use the door is tilted substantially outwardly and rearwardly so that the water thrust against the upper facing panel portion 12 is greater than the thrust against the downwardly facing panel portion 12. For this purpose,

4 when the door is being used as a port door (FIG. 2, for example) the hookup of the towing warp 26 is to an anchor eye 28 laterally offset below the horizontal center line CL of the door, the specific hookup shown being by means of a flexible shackle 30. A reversely offset anchor eye 31 is provided for use as the hookup point for the towing warp 26 when the door is inverted for use as a starboard door, the situation illustrated in FIG. 1, for example.

A sectional, marginal edging 32 of a cushioning, abrasion resistant, lightweight material (e.g. cured rubber) extends around the entire periphery of the panel 10.

Buoyancy means 34 and ballast means 36 are attached to the posterior side of said panel 10. The particular form of buoyancy means 34 and ballast means 36 that are illustrated represent typical embodiments of the buoyancy and ballast means forming the subject matter of my copending application Ser. No. 376,993, filed June 22, 1964, and entitled, Ballast and Buoyancy Attachments for Trawl Doors.

Briefly, the buoyancy means 34 and ballast means 36 are of a similar basic construction. Each comprises a body member M, M', and a pair of end standards 38. Each body member M, M' is situated between a pair of the end standards 38, and is secured thereto by means of a securement rod or bolt 40. The end standards 38 are secured to the water reaction panel by suitable fastening means, such as bolts, for example. The body member M of the buoyancy means 34 is hollow, is constructed to be gas-tight, and contains a gas, such as air. The body member M' of ballast means 36 is filled partly full at least with a heavy ballast material, such as lead pellets, for example.

When a given door D1 is inverted, the buoyancy means 34 is interchanged with the ballast means 36, and of course, the towing warp hookup is changed to the other one of the said anchor eyes 28, 31. Since the water reaction panel 10, with marginal edging 32 attached, possesses a substantially circular outline, its resistance to movement through the water is less than the resistance of doors having water reaction panels of square or rectangular proportions. This is because water is able to flow relatively past the circular panel 10 in the four regions which would be occupied by the four corners of a door having square or rectangular proportions. Since the panel 10 is substantially circular, only the central portion of its lower edge contacts the bottom; the contact made is substantially a point contact.

According to the present invention, a roll bar RB1 is provided on the posterior side of the door D1. As clearly shown by FIG. 2, the roll bar RB1 may take the form of a relatively thin, arcuate bar having a substantially uniform cross-sectional configuration throughout its entire length. The lower end of roll bar RB1 is suitably secured to the lower edge portion of the panel 10, preferably inboardly of the lower edge of the door formed by the marginal edging 32, but outboardly of the ballast means 36. The upper end of roll bar RB1 is secured to the upper edge portion of panel 10 at a location offset above the center line CL of the door the same distance that the anchorage location of the lower end of roll bar RB1 is offset below said center line. Preferably, roll bar RB1 extends rearwardly of panel 10 at substantially a right angle to the plane of the panel central portion 16, and midway between the front and rear edges of the door. Thus, the construction and arrangement of the roll bar RB1 fits into the scheme of door invertibility; no change in the arrangement of the roll bar RB1 is necessary when a given door D1 is inverted for use on the opposite side of the net.

Preferably roll bar RB1 is a segment of a thin, relatively narrow cylinder (FIG. 20). Thus, in the vertical sense, roll bar RB1 possesses a concave leading or anterior face, and a convex trailing or posterior face.

FIG. 3 is a top plan view of a try net N, as it appears when being towed in the water behind a trawler (not shown) and the course of such trawler is along a straight line. A towing line 26 is shown extending forwardly from each door D1 towards a common connection point 42 with the rear terminal of a towing warp T. The forward portion of the towing warp T is secured to a winch drum aboard the trawler. The net itself comprises a pair of side elements or wings 44 of netting and a codend 46, the after end of which is closed during trawling. The net lines 20 interconnect between the doors D1 and the respective forward terminals of the wings 44. It is desirable that the lateral forces exerted on the wings 44 by the doors D1 be substantially equal, so that the net N assumes the symmetrical shape illustrated in FIG. 3.

It is necessary during trawling to change the course or direction of travel of the trawler while the net N is in the water. During turns the outside door D1 travels on a larger arc and at a higher velocity than the inside door D1. Experience has shown that during turning the inside door quite often falls over on its back or posterior side. Sometimes such door rights itself as soon as the turn is completed and the net once again is being towed in the track of the trawler. However, quite often the inside door does not reassume an upright position, but rather remains on its back and when towed forwardly merely skids along the bottom in that position. As will be evident, when this happens the door that is riding on its back cannot produce a lateral force by water reaction. The other door on the opposite side of the net is producing a lateral force by water reaction, and such force causes the net to veer sideways and travel outboardly of the track or direction of travel of the trawler. This condition is diagrammatically illustrated by FIG. 4. The lower (port) door D1 is shown to be on its back. It only produces a drag; its towing line 26 trails essentially directly behind the towing warp T, as a continuation thereof. The upper (starboard) door D1, which is upright, still produces a lateral force F, and such force F causes an outward displacement of the forward end portion of the starboard wing 44. Owing to the absence of a force F of like magnitude acting in the port direction, the entire net assembly is moved by the force F produced by the starboard door D1 to a position offset to the starboard side of the line of travel of the trawler. The net N no longer possesses a symmetrical shape and its meshes are unevenly stressed. The sweep of the net S', i.e. the horizontal distance between forward termini of the wings 44, is about ½ the size of what it should be. The spread of the net when both doors D1 are upright and functioning is indicated and designated S in FIG. 3.

When a door is lying substantially flat on its back on the bottom the attack angle of the panel 10 is then directed downwardly; and if the bottom is soft, it often happens that such door "plows" into the bottom as it is towed forwardly. This phenomena is termed "mudding in" by those engaged in the trawling art. As can be readily understood, a door that has buried itself into the mud becomes an effective anchor and will either stop forward progress of the trawler, or cause the towing lines to break. Sometimes a door that has "mudded in" becomes so firmly embedded in the bottom that it cannot be removed and must be cut loose and abandoned.

FIGS. 6–9 illustrate the functioning of a roll bar according to the present invention, roll bar RB1 being chosen by way of typical example. Firstly, the roll bar RB1 holds the door D1 up above the bottom and prevents it from lying substantially flat on the bottom. FIGS. 6 and 9 depict what may be considered the extreme position of the door with respect to difficulty in causing it to resume an upright position. FIG. 7 represents the normal at rest portion of the door D1, with roll bar RB attached.

Assuming that a door D1 is in the extreme position depicted by FIGS. 6 and 7, immediately the ballast and buoyancy members of the door assisted by the roll bar cause the door to assume the position shown in FIG. 7. Thereafter the pull of the towing line assisted by frictional contact of the lower edge of the door with the bottom causes the door to assume its normal in use attitude as shown in FIG. 8. It is appropriate to mention here that if the door should fall on its anterior side it is rapidly brought to its proper upright attitude solely by towing line and net line stresses and the assistance of a roll bar is not needed.

Referring to FIG. 8, the door D1 is shown to assume a slightly rearwardly tilting attitude, by an angular amount X, as a result of the towing line (26) hookup to the bridle 22 being made at a location offset below the center line of the water reaction panel 10. For a more detailed treatment of the door tilting technique, and the advantages to be gained thereby, reference is made to my aforementioned U.S. Patent No. 3,048,936. To the extent that it may be necessary to a clearer understanding of the present invention, the disclosure of such Patent No. 3,048,936 is expressly incorporated herein by reference.

FIGS. 10 and 11 show a modified form of trawl door D2 incorporating a modified form of roll bar RB2.

Door D2 comprises a cast aluminum water reaction panel 48 which, like panel 10 of door D1, in vertical section is of a trihedral configuration. Panel 48 includes symmetrical panel portions 50, 52 situated respectively above and below a horizontal center line CL, coinciding with the longitudinal axis of a central panel portion 54. The upper and lower panel portions 50, 52 are swept back substantially at the panel's leading or anterior face, with the angle between the posterior sides of such panel portions 50, 52 being about 140°.

A marginal edging 56 extends around the entire edge of the panel 48. A plurality of openings (some of which are designated 58) are provided in the marginal edging 56 along the rear edge of the door. Flexible shackles 60 extend through a pair of such openings 58 and serve to connect the door D2 with the net lines 20.

The towing warp bridle (not shown) may be of the same general type as that used with the door form shown by FIGS. 12–17, which door form will hereinafter be described in detail. Quite briefly (see FIGS. 10, 11, 12 and 13), it includes a pair of rear leg members 62, 64, each of which consists of a short length of cable covered by rubber or a rubber-like material. The after end portion of the upper rear leg member 62 extends from the anterior side of the panel 48 or 86 through upper opening 58, and the lower rear leg member 64 extends from the anterior side of the panel 48 through lower opening 58. Each member 62, 64 is formed to include a terminal eye at its after end. Shackles 66 serve to connect such terminal eyes each with a selected one of a plurality of openings 67 formed in a transverse plate 68 which extends generally perpendicularly to the center line CL of panel 48.

The forward leg of the bridle may comprise a rigid strut RS that is pivotally connected at its inboard end to the panel 48 or 86. A flexible shackle 70 may serve to connect the forward termini of the bridle rear leg members 62, 64, and the outboard end of the bridle front leg member, to the towing line 26.

As in the case of door D1, the door D2 is provided with buoyancy means 72 and ballast means 74, respectively representing forms of buoyancy and ballast means that in part form the subject matter of my aforementioned copending application Ser. No. 376,993.

The roll bar RB2 is of composite form and consists of four lengths of arcuate tubing 76. The outboard end of each length 76 of tubing may be provided with a mounting pad 78 by which it may be secured to the panel 48, such as by bolts 80, for example. The inboard end portions of the tubing members 76 extend in between a pair of plates 82, 84, respectively. Bolts 86 may be used for securing said inboard portions of tubing members 76 to the plates 82, 84.

As perhaps best shown by FIG. 11, the respective outboard ends of the tubing members 76 are spaced apart further than the inboard ends of such members 76. As will be apparent, in some instances of operation the door may roll on one or the other pair of opposed members 76 (e.g. in FIG. 11 the upper right-hand member 76 is generally opposite the lower left-hand member and the two form an opposed pair), and in other instances the door will roll to an upright position on all four members 76.

As perhaps best shown by FIGS. 10 and 21, the central sections 56′, 56″ of the marginal edging 32 are substantially wider than the other sections of said edging 32. The purpose of this is to increase the area of contact of the lower edge of the door D2 with the bottom. Since the door D2 is invertible (as will hereinafter be explained in more detail), a widened edging section is provided along the top as well as along the bottom edge of the water reaction panel 48. The sections 56′, 56″, which may be termed "runner sections," overlie and underlie the upper and lower end portions respectively of the roll bar RB2. As clearly shown by FIG. 21, such sections 56′, 56″ each possess convexly curved outboard surfaces which are generally concentrically related to the rear side of the roll bar RB2.

The trawl door embodiment illustrated by FIGS. 12–17 is described in detail in my copending application Ser. No. 393,026, filed Aug. 31, 1964, and entitled Trawl Doors Consisting of Components Usable to Make Up Various Size Doors. Quite briefly, such door (designated D3 in the drawing) comprises a water reaction panel 86 which in vertical section is of a trihedral configuration, and is curved fore and aft with its anterior surface being of concave curvature. The panel 86 may be formed to include a plurality of vertically spaced, horizontally extending guide vanes V on its anterior surface. Such vanes V serve to guide the water generally straight rearwardly across the anterior surface of the door. The guide vane feature in part forms the subject matter of my U.S. Patent No. 3,247,612, issued Apr. 26, 1966, and entitled Trawl Doors With Longitudinal Anterior Vanes.

The roll bar RB3 associated with door D3 comprises a pair of preferably identical end pieces 88 and a horizontally and vertically arcuate panel member 90. The panel member 90 is suitably attached to mounting flanges 92 formed at the outboard ends of end pieces 88, such as by bolts 94, for example. Each end piece 88 may include a pair of tubular struts 96, each connected at its outboard end to one end of the mounting flange 92 associated therewith, and at its inboard end to an edge portion of the water reaction panel 86.

Referring now to FIG. 14, the panel 90 constitutes an auxiliary water reaction panel for the door D3 in addition to being a principal component of the roll bar RB3. Horizontally considered, its leading or anterior surface is of concave curvature, the same as the larger water reaction panel 86. Since panel 90 is a component of the roll bar RB3, it must be of convex-concave curvature in the vertical direction as well, with the leading surface possessing the concave curvature. As a result, the water moves in relative contact with the anterior surface of panel 90 tends to be directed thereby generally inwardly toward the center of such panel 90 as well as towards its rear edge. Since maximum efficiency (i.e. the largest lateral component of force) is obtained when all the water has its direction of travel changed to the full extent made possible by the angle of attack of panel 90, and its fore and aft curvature, guide vanes V′ are preferably provided on the anterior surface of panel 90. Such vanes V′ function in a manner similar to vanes V, i.e. they channel the water and cause it to move generally straight rearwardly across the anterior surface of the panel 90.

As in the case of roll bars RB1, RB2, the roll bar RB3 is symmetrically constructed about the vertical center (or horizontal center line) of the water reaction panel with which it is associated. Thus, the arrangement of the roll bar is a part of the invertible nature of the entire door.

In FIG. 16 the door D3 is shown to assume a slightly rearwardly tilting attitude, of an angular amount X.

Door D3 includes a plurality of buoyancy units 98 and ballast units 100, arranged on the posterior side of the water reaction panel 86. The particular form of buoyancy and ballast means illustrated are identical to those described briefly above in connection with door D1, and described more fully in my aforementioned copending application Ser. No. 376,993.

FIGS. 18, 19 and 23 illustrate still another form of trawl door, together with another form of roll bar according to the present invention. This door, designated D4, comprises a large, generally circular water reaction panel 102, possessing in vertical section a generally dihedral configuration. On its posterior side the panel 102 is suitably attached to a pair of horizontal frame bars 104, 106, such as by clamping rings 108 and bolts 110 securing such clamping rings 108 to rib portions 112 of the panel 102. The bars 104, 106 each extend rearwardly past the rear edge of panel 102 and form what may be termed rear extensions. One or more auxiliary water reaction panels 114 are secured to such extensions in the same manner as the larger main panel 102. Vertically considered, the auxiliary panel members 114 are also of a shallow V or dihedral configuration. As will be evident, each additional auxiliary panel 114 that is employed increases the total area of the door D4, and the number of such auxiliary panel members 114 necessarily is dependent upon the particular spread requirements of the particular net with which such door is employed.

As best shown by FIG. 18, a ring member 116 is attached to the rear end of each bar 104, 106. A pair of flexible shackles 118 engage the eye ring portion 120 of such members 116 and are attached to the net lines 20. The rear leg members 122, 124 of a bridle each loop through a related one of said eye rings 120 and extend forwardly therefrom to meet with the forward terminal of the other rear leg member, and with the outboard end portion of a rigid forward leg member 126. The said outboard end portion of leg member 126 is itself in the form of an eye 128, and a flexible shackle 130 loops through first and forward terminal eye of leg member 122, then through eye 128, and finally through the forward terminal eye of leg member 124. A conventional metal shackle 132, or the like, connects shackle 130 to a rear end terminal of a towing line 26. As clearly shown by FIG. 19, an eye 134 is also formed at the inboard end of forward leg member 126, and a mounting ring 136 engages such eye 134 and serves to pivotally attach the said inboard end of the forward leg member 126 to a forward central portion of the panel 102.

Referring again to FIG. 18, door D4 also comprises attitude control means consisting of buoyancy units 138, ballast means 140, and a roll bar RB4. Roll bar RB4 constitutes a plate member that is generally a section of a sphere. It is of concave-convex curvature both horizontally and vertically, with a concave curvature being on its leading side, and the convex curvature on its trailing side. The lower edge portion or lower terminal of roll bar RB4 is suitably attached to the lower edge portion of the water reaction panel 102, or is formed integral therewith and such lower edge portion is detachably secured to the remaining portion of panel 102. A reinforcing strut 142 may extend between the upper edge portion of roll bar RB4 and the lower frame bar 106.

The buoyancy units 138 may take the form of spherical air cells and may be attached to the upper frame bar 104 by means of mounting sleeves 144. Preferably, the ballast means is mounted directly on the roll bar RB4. It may comprise a plurality of stacked plates bolted or otherwise secured to the roll bar RB4.

As perhaps best shown by FIG. 23, the ballast means 140 are situated in what may be termed the valley portion of the roll bar RB4, between the lower portion of the panel 102 and the upstanding portion of the roll bar RB4.

Of course, as in the case of each of the other door forms, described above, the number of buoyancy units 138 and ballast plates making up the ballast means 140 is dependent upon the door size, the desired attitude of the door in the water, and on other factors. Generally speaking, however, the ballast means of any door tends to weight and pull downwardly the edge portion thereof onto which it is secured, or adjacent which it is situated, and the buoyancy means serves to lift or buoy up the opposite edge portion of the door.

Referring now to FIGS. 20–23, such figures present solid line showings of the doors D1, D2, D3, D4 in generally flat positions on their respective back sides, but resting on their respective roll bars and not flat upon the bottom. Such figures also present broken line showings of such doors in their righted or generally upright positions of use. It is to be noted that in all of the door forms the ballast means is offset to the lower edge side of the door from the point of contact with the roll bar and the bottom. This is true even with door D4 shown by FIG. 23. Additionally, the buoyancy members act to lighten the opposite edge side of the door. As a result, the extreme positions depicted by solid lines in these views do not represent positions of equilibrium of the doors. Rather, the doors rotate on its roll bar in the counterclockwise direction (as pictured) until its lower edge makes contact with the bottom, in which position the door is at rest (i.e. its position of equilibrium). The buoyancy and ballast means together form a couple tending to roll the door on the roll bar over until the lower edge contacts the bottom. From its position of rest (FIG. 7, for example) the door is easily pulled to a generally upright position when tension is put into the various towing lines.

Since about ⅔ of door D4 is situated above the upward terminal of roll bar RB4, the condition of rest of door D4 may in some instances be the position illustrated in FIG. 23. However, owing to the location of the ballast means 140 to the left (as pictured) of the point of contact of roll bar RB4 with the bottom, such position is an unstable position, and when a pull is exerted on the door D4 by the towing lines, it readily leaves the position illustrated and moves into a generally upright position.

Door D4 is invertible. However, upon inverting it, the roll bar RB4, which is symmetrically constructed about a vertical center line, must be changed from the lower to the upper edge of the door. Preferably, roll bar RB4 constitutes a lower section of marginal edging for panel 102 which is of the same arc length as the upper section 146 of such marginal edging. Thus, when the door is inverted, the roll bar RB4 is merely interchanged with the edging section 146. Of course, the buoyancy units 138 must be moved from frame bar 104 to frame bar 106.

Although the roll bar attachments of the present invention are illustrated in combination with doors which are of either a trihedral or a dihedral configuration in vertical section, it is to be understood that such roll bars may have application with doors which are flat vertically, or which are of arcuate form in the vertical direction.

Preferably, the vertical curvature of the roll bar types associated with doors D1, D2, D3 should not be any flatter than a circular curve formed with its center substantially at the apex of the water reaction panel (FIG. 21, for example, wherein the center of curvature is designated CC). Preferably, however, the center of curvature of a roll bar is offset rearwardly of such apex (FIG. 20). Flatter curves may be used when struts or end pieces are used with the arcuate portion of the roll bar (FIG. 22).

In doors D1, D2, D3 the upper and lower ends of the roll bars RB1, RB2, RB3 are situated inboardly of the upper and lower edges, respectively, of the door. At the lower edge of the door the marginal edging may be said to "underlie" the lower end of the roll bar. In the door form of FIGS. 18, 19 and 23, however, the roll bar RB4, itself, forms the lower edging for the door.

In each of the door forms D1, D2, D3, D4 the ballast weight means is disposed between the water reaction panel and the roll bar, and is offset inboardly of the lower edge of the door, so that wear on the lower edge will have essentially no effect on the amount of ballasting being provided.

From the foregoing, various further modifications, arrangements and adaptations of roll bar attachments, as described above, will occur to those skilled in the art to which the invention is addressed, within the scope of the following claims.

What is claimed is:

1. A bottom trawl door of a type that tends to take a substantially prone or supine at rest position on the bottom when influenced only by its own weight, said door comprising a body of substantial area having upper and lower edge portions and anterior and posterior sides; and a roll bar disposed on the posterior side of said door body, said bar having a lower end rigidly affixed to the lower edge portion of the door body, and an arcuate body curving first outwardly and upwardly from said lower end, and then inwardly and upwardly to the upper edge portion of the door body, and presenting a vertically concave inward side and a vertically convex outward side, and means securing the upper end of said roll bar to the upper edge portion of said door body, and said trawl door further includes a lower section of marginal edging which underlies the lower end portion of the roll bar and has a convexly curved lower surface which is generally concentrically related to the lower end portion of the roll bar where it is attached to the door body.

2. A bottom trawl door of a type that tends to take a substantially prone or supine at rest position on the bottom when influenced only by its own weight, said door comprising a body of substantial area having upper and lower edge portions and anterior and posterior sides; and a roll bar disposed on the posterior side of the door body, said bar having a lower end rigidly affixed to the lower edge portion of said door body, and an arcuate body curving first outwardly and upwardly from said lower end, and then inwardly and upwardly to the upper edge portion of the door body, and presenting a vertically concave inward side and a vertically convex outward side, and means securing the upper end of said roll bar to the upper edge portion of said door body, said roll bar body comprising an auxiliary water reaction panel of substantial area offset rearwardly of the said door body to which the roll bar is attached a sufficient distance to place it in the water which moves relatively past the door body to which said roll bar is attached, on the outer side thereof.

3. A bottom trawl door of a type that tends to take a substantially prone or supine at rest position on the bottom when influenced only by its own weight, said door comprising a water reaction panel having upper and lower edge portions and anterior and posterior sides; and a roll bar disposed on the posterior side of the panel, said bar having a lower end rigidly affixed to the lower edge portion of the panel, and an arcuate body curving first outwardly and upwardly from said lower end, and then inwardly and upwardly to the upper edge portion of the water reaction panel, and presenting a vertically concave inward side and a vertically convex outward side, and means securing the upper end of said roll bar to the upper edge portion of said panel, said roll bar body comprising an auxiliary water reaction panel offset rearwardly of the said panel to which the roll bar is attached, and tubular struts at each end of the auxiliary water reaction panel, securing it to the upper and lower edge portions of the said panel to which the roll bar is attached.

4. A bottom trawl door of a type that tends to take a substantially prone or supine at rest position on the bottom when influenced only by its own weight, said door comprising a water reaction panel having upper and lower edge portions and anterior and posterior sides; and a roll bar disposed on the posterior side of the panel, said bar having a lower end rigidly affixed to the lower edge portion of the panel, and an arcuate body curving first outwardly and upwardly from said lower end and then inwardly and upwardly to the upper edge portion of the water reaction panel, and presenting a vertically concave inward side and a vertically convex outward side, and means securing the upper end of said roll bar to the upper edge portion of said panel, said roll bar body including an auxiliary water reaction panel offset rearwardly of the said panel to which the roll bar is attached, and both water reaction panels presenting horizontally concave anterior surfaces.

5. A bottom trawl door according to claim 4, wherein a plurality of vertically spaced, horizontally extending guide vanes extend outwardly from the anterior surface of said auxiliary water reaction panel.

6. A bottom trawl door comprising a water reaction panel intended to be generally upright and at a given angle of attack in use, said panel having upper and lower edge portions and anterior and posterior sides; a roll bar disposed on the posterior side of the door, said bar having a lower end secured to said lower edge portion of the panel, and an arcuate body curving outwardly and upwardly from said lower end, said body presenting a vertically concave inward side and a vertically convex outward side, with said outward side providing a rocker-like support on which the door rests when in a supine position on the bottom; and ballast weight means situated on the posterior side of said water reaction panel, inwardly of said roll bar, said ballast weight means being spaced slightly inboardly of the said lower edge portion of the water reaction panel, but towards the lower edge portion of the water reaction panel from the location of roll bar contact with the bottom when the door is in a supine position, so that said ballast weight will exert a moment on the door, tending to rock it on said roll bar support from the supine position towards a generally upright position on its lower edge.

7. A bottom trawl door according to claim 6, said door further including buoyancy means on the posterior side of said water reaction panel, adjacent the said upper edge portion thereof and towards the upper edge portion of the water reaction panel from the location of roll bar contact with the bottom when the door is in a supine position so that said buoyancy means will provide a door-righting moment that is additive to, and forms a couple with, the moment provided by said ballast means.

8. A bottom trawl door according to claim 7, wherein the water reaction panel has a central portion and upper and lower portion, and said anterior side being swept back vertically about said central portion.

9. A bottom trawl door comprising a substantially circular water reaction panel portion presenting a vertically convex anterior surface; a roll bar situated on the posterior side of said panel, said roll bar comprising a plate member that is substantially a segment of a sphere, said plate member having a lower edge secured to and generally along the said lower edge portion of the water reaction panel, said member also having an anterior surface that is of concave curvature both vertically and horizontally, and a posterior surface that is of convex curvature both vertically and horizontally, such plate member terminating short of the upper edge of said water reaction panel.

10. A trawl door according to claim 9, wherein a ballast weight means is secured to said door, between said water reaction panel and said roll bar.

11. A trawl door according to claim 10, wherein the said ballast weight means is mounted on the roll bar.

References Cited

UNITED STATES PATENTS

| 2,066,519 | 1/1937 | Clark | 43—9 |
| 2,504,091 | 4/1950 | Scheel | 43—9 |
| 2,942,371 | 6/1960 | Johnson et al. | 43—9 |

FOREIGN PATENTS

| Ad. 5,782 | 1897 | Great Britain. |
| Ad. 7,373 | 1896 | Great Britain. |
| 316,123 | 8/1929 | Great Britain. |
| 961,742 | 6/1964 | Great Britain. |

SAMUEL KOREN, *Primary Examiner.*

WARNER H. CAMP, *Examiner.*